(12) United States Patent
Fan et al.

(10) Patent No.: US 7,991,235 B2
(45) Date of Patent: Aug. 2, 2011

(54) LIGHT COMPRESSION FOR COLOR IMAGES USING ERROR DIFFUSION

(75) Inventors: Zhigang Fan, Webster, NY (US); Francis Tse, Rochester, NY (US); John Christopher Cassidy, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1190 days.

(21) Appl. No.: 11/711,110

(22) Filed: Feb. 27, 2007

(65) Prior Publication Data
US 2008/0205765 A1    Aug. 28, 2008

(51) Int. Cl.
*G06K 9/46* (2006.01)
*G06K 9/00* (2006.01)
*G06K 9/40* (2006.01)
*H04N 11/20* (2006.01)
*H04N 7/01* (2006.01)
*H04N 5/00* (2006.01)

(52) U.S. Cl. ........ 382/232; 382/162; 382/166; 382/260; 382/262; 382/264; 348/453; 348/610

(58) Field of Classification Search ................. None
See application file for complete search history.

(56) References Cited

U.S. PATENT DOCUMENTS

| | | | |
|---|---|---|---|
| 5,243,444 A | | 9/1993 | Fan |
| 5,845,017 A | * | 12/1998 | Keyes .......................... 382/261 |
| 6,760,127 B1 | | 7/2004 | Shin et al. |
| 2003/0215153 A1 | * | 11/2003 | Gindele et al. ............... 382/254 |
| 2005/0036696 A1 | * | 2/2005 | Hatti et al. .................... 382/233 |
| 2007/0182848 A1 | * | 8/2007 | Wyman et al. ................ 348/450 |

OTHER PUBLICATIONS

Lee, Digital Image Smoothing and Sigma Filter, 1983, Computer Vision Graphics & Image Processing, vol. 24, pp. 255-269.*
Venable et al., "Selection and Use of Small Color Sets for Pictorial Display," *The Society for Imaging Science and Technology*, SPSE's 43$^{rd}$ Annual Conference, May 20-25, 1990, pp. 90-92.

* cited by examiner

*Primary Examiner* — Anand Bhatnagar
*Assistant Examiner* — Randolph Chu
(74) *Attorney, Agent, or Firm* — Pillsbury Winthrop Shaw Pittman LLP

(57) ABSTRACT

A light compression method that error diffuses image data provided with luminance and chrominance channels. During error diffusion, a higher number of bits are allocated to the luminance channel. A decompression method for the image data based on sigma filtering is also provided. By manipulating the bits in the luminance and chrominance color spaces, the image output quality may be increased in reconstructed images.

5 Claims, 4 Drawing Sheets

LIGHT COMPRESSION FOR COLOR IMAGES USING ERROR DIFFUSION

FIELD

The present application is generally related to compressing color image data using error diffusion, wherein the image data is encoded using the luminance channel and chrominance channels. Also provided is a decompression method of such color image data based on sigma filtering.

BACKGROUND

A color image comprises a number of pixels. Each pixel corresponds to a defined location in the image. The pixels have a number of components that contribute to defining the image, such as color and intensity. For example, a given pixel may be defined in terms of a color space with three values, such as RGB—R for red, G for green, and B for blue—or four values, such as CMYK—C for cyan, M for magenta, Y for Yellow, and K for black. A color space may also be designed to contain a luminance channel and two chrominance channels, such as YCbCr space. In YCbCr space, Y corresponds to the luminance channel, which represents the brightness or intensity of a color, and Cb and Cr are chrominance channels, which represent the blue and red chrominance components, respectively. Each pixel of the image is assigned a number in each color space representing the intensity for that color space at that particular spot. Images that have a large number of color or intensity levels are referred to as continuous tone images or contone images. For example, an 8-bit value comprises 256 values or intensity levels for each color.

It is possible, however, to create the impression of a continuous tone image by using halftoning. The halftone process is generally known, and various methods for halftoning exist. A binary halftone process converts a continuous tone image into a binary image; that is, the image data is converted to an image of black/color and white spots that "appear" to be a continuous tone image. A halftone process may also be multiple-level. Multiple level halftoning converts an input continuous tone image of M levels into an output image of N levels, wherein N is less than M. An example of such a process may include error diffusion. An error diffusion method may include determining a quantization error for a given pixel based on intensity values of the pixel in the original image and based on weighted error values of certain neighbor pixels. The error values are then fed back, possibly filtered by an error filter, and added to the unprocessed pixels of the input continuous tone image. This causes the quantization error to be compensated by the future processing. The error diffusion process may also be binary or multiple level. Examples of a multiple level error diffusion process is disclosed in U.S. Pat. No. 6,760,127, entitled "Multi-Level Semi-Vector Error Diffusion," filed on Jun. 1, 2000 and issued on Jul. 6, 2004 to the Applicant, which is hereby incorporated by reference in its entirety.

Quite often, image data is lightly compressed or coded. The purpose of compression is to reduce the amount of image data, i.e., reduce the file size, with little sacrifice of the image quality. It is a process of encoding information with fewer bits, and enables devices to transmit or store the same amount of data. Compression of image data may be performed using many known processes, such as JPEG, JBIG, JBIG2, and JPEG200 compression. These compression methods provide an adequate compression ratio and a decent image quality for many applications. However, they are typically complicated. Both encoding and decoding of the image data requires significant computation and intermediate buffering storage. In addition, the compressed image data of these processes has different bit arrangements than the original image data. Many image processing operations, such as image rotation, cropping, and scaling may not be easily performed on the compressed image data without first decompressing the data. Thus, the compression and decompression methods can be further improved.

SUMMARY

One embodiment provides a method for decompressing a compressed image data in a luminance and chrominance color space, the image data having a plurality of pixels wherein each pixel has a luminance channel and at least two chrominance channels, the luminance channel being encoded with more bits than each of the chrominance channels; the method comprising: interpolating the chrominance channels for the pixels so that the chrominance channels have the same amount of bits as the luminance channel; and for each pixel: establishing a window including the pixel and neighboring pixels; comparing a bit value for the luminance channel for each neighboring pixel to a bit value for the luminance channel for the pixel; and for each neighboring pixel having a bit value for the luminance channel that differs from the bit value for the luminance channel for the pixel by less than a threshold, averaging the bit values of at least the luminance channel for the pixel to output averaged bit values for the chrominance channels for the pixel. The method may further comprise averaging the bit values of the luminance and chrominance channels for the pixel to output averaged bit values for each of the luminance and chrominance channels for the pixel. The method may also further comprise processing the decompressed image data. The method may also include sending the image data to an output device, such as a printer or display. Interpolation of the chrominance channels may be established by pixel repetition.

In another embodiment, a system is provided for compressing an image data. The system comprises a processor for transforming pixels of image data in a device space to a luminance and chrominance color space, each pixel having a luminance channel and at least two chrominance channels and an error diffusion engine for compressing the image data in the luminance and chrominance space. The system preferably modifies the image data such that the image data has more bits in the luminance channel than each of the chrominance channels upon completion of compression.

The system may further comprise a decompression unit for decompressing the luminance and chrominance channels of the image data. In one embodiment, the decompression unit uses sigma filtering. The system may also further comprise an output device for reproducing the image data after decompression. The output device may be a display or a printer.

Another embodiment provides a method for compressing an image data, the method comprising: providing image data in a device space wherein each pixel has a plurality of color channels; transforming the image data to color space wherein each pixel has a luminance channel and at least two chrominance channels; and compressing the image data in the luminance and chrominance color space by error diffusion wherein the compression results in more bits encoding the luminance channel than each of the chrominance channels. The method may further comprise sub-sampling the chrominance channels to reduce the file size before compressing the image data, as well as comprise decompressing the luminance and chrominance channels of the image. In one embodiment, decompression is based on sigma filtering. The method may also comprise outputting the decompressed image to an output device.

The luminance and chrominance channels that are processed using the above methods or the system any one of the following: YCbCr, YPbPr, YDbDr, YIQ, YUV, L*a*b, YES color spaces or any other color space known or developed hereafter.

Other objects, features, and advantages of the present application will become apparent from the following detailed description, the accompanying drawings, and the appended claims.

DETAILED DESCRIPTION OF THE ILLUSTRATED EMBODIMENT(S)

As noted above, color images are divided into pixels, which are defined in terms of a color space. Each pixel has a plurality of color channels each encoded by multiple bits (e.g., image data is in a color space such as RGB, and the image data has 8-bits per pixel.) In the present application, the image data that is used is that of a color image defined by luminance and chrominance spaces. When image data is provided in luminance and chrominance space, the bits may be compressed and allocated to the luminance and chrominance channels. Particularly, as will be described, a higher number of bits may be allocated to the luminance channel than the chrominance channels. The luminance component of image data may be processed independently from its chrominance components. Thus, a reduced number of bits are processed in the described method herein. Using luminance and chrominance channels in the image space is beneficial due to the resulting image that is output and perceived by the human eye. The human eye is more sensitive to details and differences in luminance (also referred to as intensity or brightness) than chrominance. Therefore, the chrominance channels can contain less detailed information. By manipulating the bits in the luminance and chrominance color spaces, the image output quality may be increased in reconstructed images. Particularly, images look less noisy, and appear sharper in text regions.

In an embodiment, an error diffusion process is used to compress the image data. A benefit of using error diffusion is that it is designed to reduce the bit depth, which is the number of bits per pixel for each color, and does not rearrange the image data structure. Many image processing operations, such as image rotation, cropping, and scaling, may also be performed on the compressed data without first decompressing.

Another advantage of the present method is it computational simplicity. Compared to most existing compression methods, the present method requires much less computation and storage when compressing (i.e., encoding) and decompressing (i.e., decoding) the image data.

Figure 1:
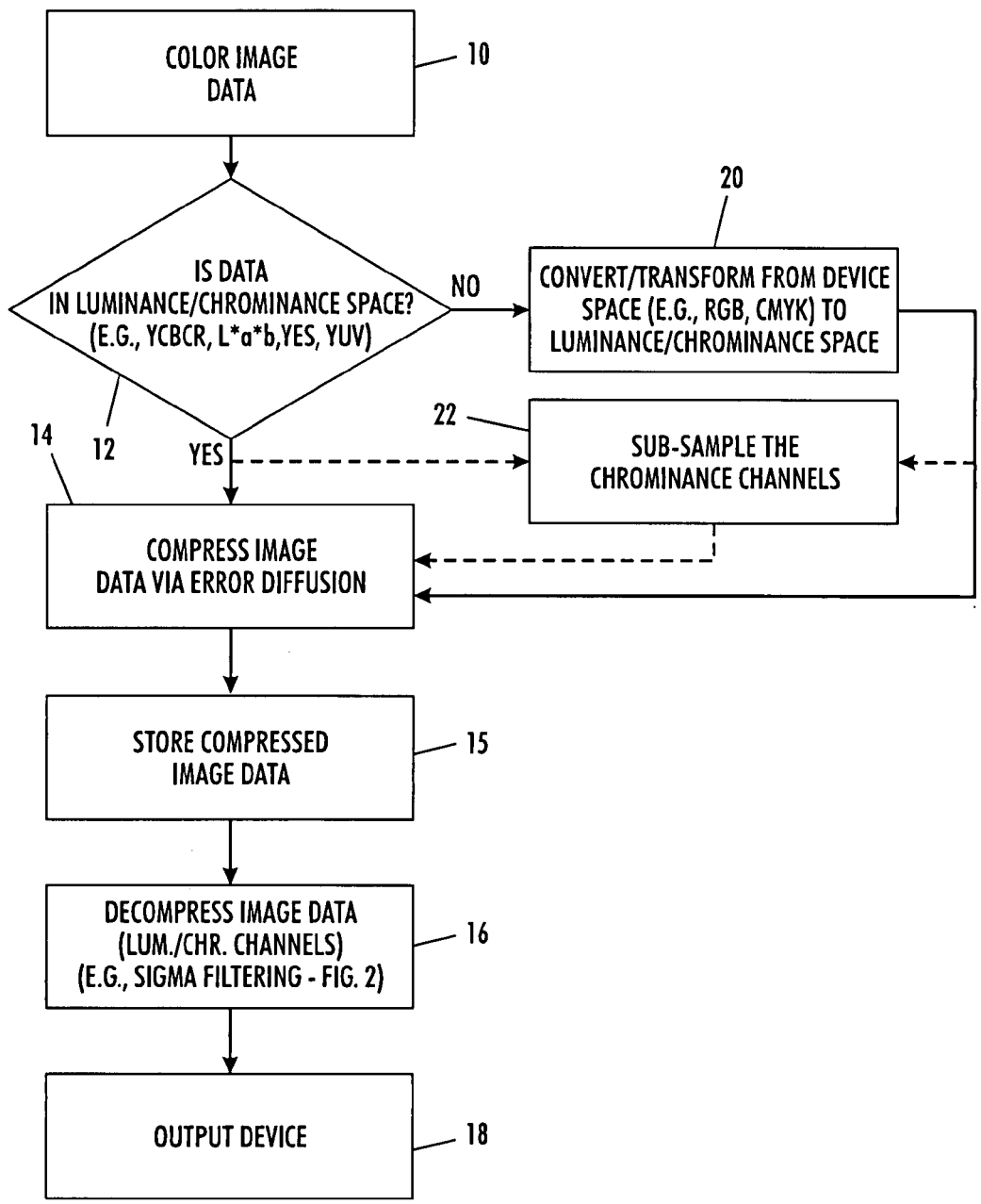
FIG. 1 is a flowchart showing a method for compressing the luminance and chrominance channels for each pixel of a colored image using error diffusion in a preferred embodiment.

FIG. 1 is a flowchart showing a method for compressing the luminance and chrominance channels for each pixel of a colored image. As shown, image data 10 for a color image is provided or inputted. An example of such data may be input by a scanner, for example. Also, the image data may also be retrieved from a memory, or a network location. The image data may be provided in a color space or with color channels that corresponds to the scanner device, i.e., in a device space. An example of image data that is in device space is image data that is in RGB (red, green, blue) format. Alternatively, the image data may be provided in luminance and chrominance color space, with luminance and chrominance channels. Examples of such image data are those supplied in YCbCr, YUV, L*a*B, or YES format.

As noted above, the color channels may be in device space or luminance or chrominance space. In a preferred embodiment, the method described with reference to FIG. 1 processes image data in luminance and chrominance color space. Particularly, the color space comprises a luminance channel and at least two chrominance channels. In one embodiment, the image data with luminance and chrominance channels is that which is in YCbCr color space. YCbCr space, which may also be referred to as YCC space, is a family of color spaces often used to represent digital video. In YCbCr space, Y corresponds to the luminance channel, which represents the brightness or intensity of a color, and Cb and Cr are chrominance channels, which represent the blue and red chrominance components relating to the hue and saturation of a color. Image data with luminance and chrominance channels, such as those in YCbCr color space, has energy that is more compact than those in device color spaces, such as RGB.

Referring back to FIG. 1, color image data 10 is provided, and it is then confirmed if the image data is provided in a luminance and chrominance color space 12. If yes, the image data in the luminance and chrominance space is compressed using error diffusion 14. Image data that is compressed may also be referred to as "coded" or "encoded" image data, referring to the process of encoding the pixels of the image data to reduce the amount of data, such as for the process of storing or transferring the image data. The error diffusion processes used may be similar to that which is mentioned above and is herein incorporated by reference. Despite the error diffusion process used, the compression of the image data is performed such that more bits are allocated to the luminance channel than each of the chrominance channels, i.e., the luminance channel has a higher bit allocation. As noted above, the advantage of supplying more bits to the luminance channel than the chrominance channels is that the output image will be of better quality, particularly sharper details and less noise. This is because the human eye is more sensitive to details and noise present in the color intensity than to hue or saturation of a color. For example, if the image data used has 24 bits per pixel (i.e., 8 bits for each channel), the luminance channel (e.g., Y) may be error diffused with 2 to 3 bits per pixel, while each of the chrominance channels (e.g., Cb and Cr) are diffused with ¼ to ½ bits per pixel (i.e., sub-sampled by a factor of 2 in one or two directions). Thus, the image data results in 2.5 to 4 bits per pixel in each of the channels. Since both the input and output have the same number of pixels, the compression ratio (the ratio between the input file size and the output file size) is 6 to 9.6. A predetermined parameter in the error diffusion process specifies how many bits are used.

If, however, the color image data is provided 10 in a device space, the image data will first be transformed. As shown in FIG. 1, the image data is transformed into a luminance and chrominance space, with luminance channel and two chrominance channels 20. For example, if image data is provided in RGB (red, green, blue) color space, the image data is processed and transformed into a color space with luminance and chrominance channels (e.g., YCbCr). Such transformations are well-known and need not be described herein.

Also shown in FIG. 1 is the ability to further reduce the size of the image data. Before compressing the image data 14, the chrominance channels may be sub-sampled 22 to further reduce the file size. Sub-sampling is a scaling process that is used to alter the quantity of information stored. Because the chrominance channels generally contain less information, sub-sampling the chrominance channels aids in reducing the amount of image data. The sub-sampling process is designed to reduce the amount of image data. Sub-sampling of the chrominance channels may be performed by interpolating between pixel values in local neighborhoods, or by replacement of a group of pixel values by one chosen pixel value from within the group.

After compressing the image data using error diffusion 14, the compressed data is stored 15. Optionally, the compressed image data may also be transmitted to a device.

Although the coded images may be viewed without decoding, in most applications, decompression of the image data is necessary. Image data that is compressed may be decompressed, also referred to as "decoded" or "decoding" image data, referring to the process of decoding the pixels of the image data to expand the amount of data, such as for the process of outputting the image data to an output device. As shown in FIG. 1, the luminance and chrominance channels of the image data are decompressed 16 to be output to an output device 18 (such as, e.g., a printer or display). In a preferred embodiment, decompression is based on sigma filtering. A known method of sigma filtering used for descreening black and white halftone images is noted in U.S. Pat. No. 5,243,444, which is herein incorporated by reference in its entirety. As will be further described in FIG. 2, a sigma filtering method is the decompression method performed on the color image data 10.

Figure 2:
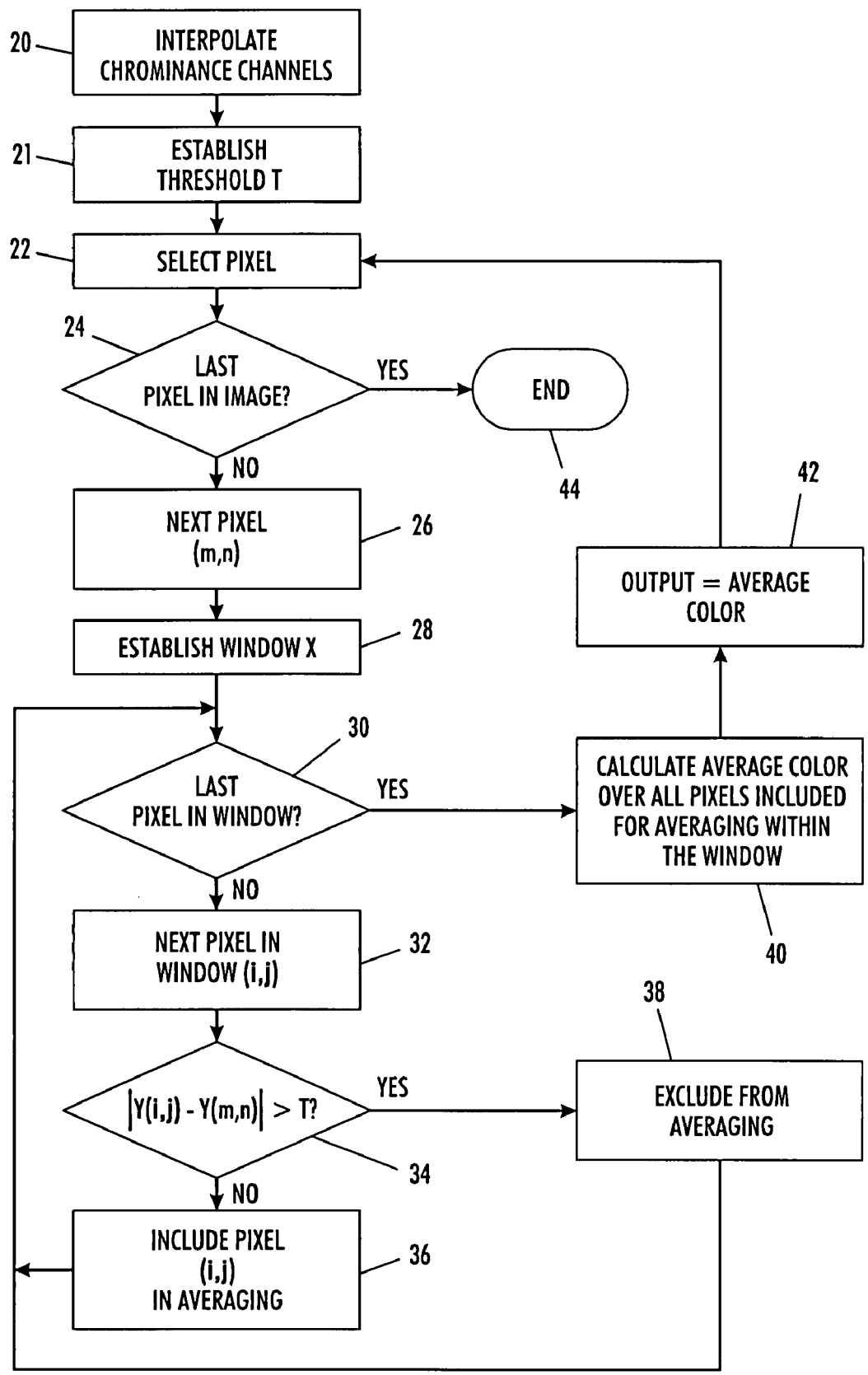
FIG. 2 is a flowchart showing a preferred method for decompressing the pixels of a colored image using sigma filtering in a preferred embodiment.

FIG. 2 is a flowchart showing a preferred method for decompressing the pixels of color image data using sigma filtering. First, the image data, comprising pixels that each have luminance and chrominance channels, are obtained. The chrominance channels of the image data may then be interpolated for each of the pixels 20 so that the chrominance channels have the same size (i.e., the number of pixels) as the luminance channel. For example, if the luminance channel (Y) has a width of W and a height of H, and each of the chrominance channels (e.g., Cb and Cr) with a width of W/2 and a height of H/2 (i.e., the chrominance channels have been sub-sampled by a factor of 2 in the horizontal and vertical directions), the chrominance channels may then be interpolated by a factor of 2 in each direction and thus result in a width of W and a height of H (which is the same as the luminance channel).

Interpolation of the chrominance channels may be established, for example, by pixel repetition. Pixel repetition is a known method for repeating a pixel value (or color) and assigning that value to neighboring pixels. Once interpolated, the three channels may then be processed together.

A predetermined threshold value, T, is chosen or defined 21. Threshold value T is used for the comparison of the luminance channels of neighboring pixels within a window. More specifically, the number of pixels to be averaged within a selected window will be dependent upon the threshold value T, as further described below.

After the pixels are provided 20, and threshold T is established 21, a pixel (m, n) is selected 22. If it is not the last pixel 24 in the image, the process continues. For each selected pixel (m, n), a window, X, and is established 28. A window X refers to those pixels in proximity to or surrounding the pixel selected. An example of a window is a 3×3 window centered at (m, n). The selected pixel (m, n) is considered to be a center pixel, and the surrounding eight pixels are the "neighbors" of the center pixel. Once the window X is chosen, the pixels within the window X are processed individually (i.e., one by one). If there are still unprocessed pixels in the window 30, another pixel (i, j) is selected for comparison 32. For each pixel (i, j) in the window, the bit value for the luminance channel Y (i, j) is compared to the bit value for the luminance channel Y (m, n) of the center pixel 34 using the predetermined threshold value, T. For example, the threshold value T may be one halftone level. A halftone level is defined by the halftone value assigned to the channel. For example, for image data with 8 bits per pixel, there are 256 ($2^8$) values or intensity levels used to represent each color. When the image data is compressed using error diffusion, the image data may be compressed to 3 bits per pixel. The image data thus has 8 ($2^3$) possible halftone levels. The 8 possible halftone levels correspond to a color or intensity that is represented in the device color model (e.g., 0, 36.4, 72.9, 109.3, etc.). So, halftone level 1 represents color value 36.4 (or integer value 36), halftone level 2 represents color value 72.9 (or integer value 73), and so on. Therefore, one halftone level therefore represents a value of 36.

If the difference between the bit value for the luminance channel Y (i, j) and the bit value for the luminance channel Y (m, n) for the center pixel is less than the predetermined threshold T (e.g., one halftone level), the selected pixel (i, j) is included in the averaging 36. For example, if the bit value of the neighboring pixel (i, j) has a halftone level of 2, and the bit value of the selected pixel (m, n) has a halftone level of 1, the difference is one halftone level.

If the difference between the luminance channels for each of the bits is greater than the threshold, the bit is excluded 38. For example, if the bit value of the (i, j) has a halftone level of 3, and the bit value of the center pixel (m, n) has a halftone level of 1, the difference is two halftone levels. Therefore, the bit is excluded from the averaging of color.

Once each of the pixels in the established window X for the selected pixel is processed (i.e., it is determined that the selected pixel is the last pixel to be processed in the window 30), the average for each of the pixel values of at least the luminance channel of all of the pixels included in the averaging at step 36 in the window X is calculated 40. The output for the selected pixel is then assigned the averaged value 42 for at least the luminance channel. The process of assigning an average color to at least the luminance channel of the pixels in a window then continues for each pixel selected in the image data.

In one embodiment, the average for each of the pixel values of the luminance and chrominance channels of all of the pixels included the averaging in the window is calculated. The output for the selected pixel is then assigned the averaged value for the luminance and chrominance channels. The process of assigning an average color to the luminance and chrominance channels of the pixels in a window then continues for each pixel selected in the image data.

The averaging is likely to include all of the pixels in the window in an area of uniform color. When the center pixel is close to an edge, the method is likely to exclude the pixels on the other side of the edge in the averaging because of the difference in luminance intensity levels.

Figure 2A:
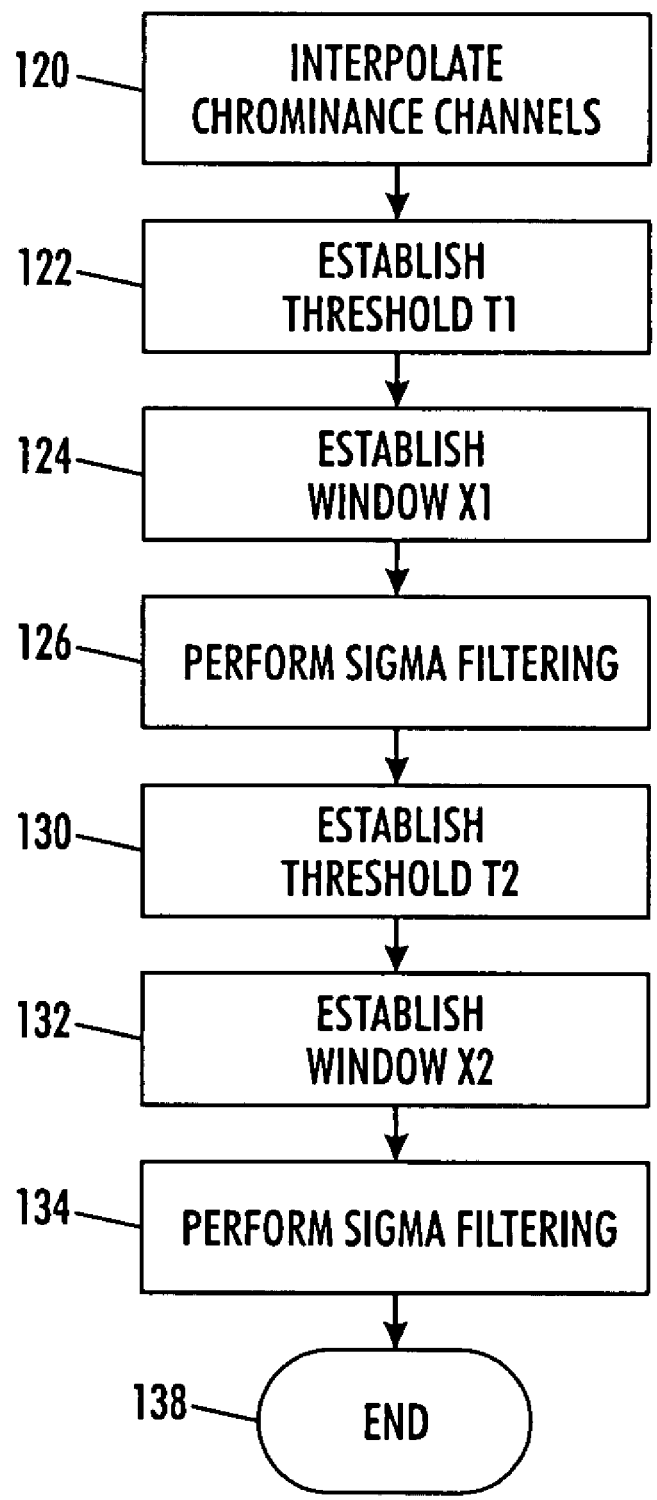
FIG. 2a is a flowchart showing a method in an alternate embodiment for decompressing the pixels of a colored image multiple times using a sigma filtering process.

FIG. 2a is a flowchart showing a method in an alternate embodiment for decompressing the pixels of a colored image multiple times using a sigma filtering process. The method of FIG. 2a is applicable for the image data that has been error diffused with 1, or 2 bits per pixel, for example. After the chrominance channels are interpolated 120, the sigma filtering process (shown in FIG. 2) is performed on the image data in multiple steps (i.e., sigma filtering is performed at least more than once). A first threshold T1 and a first window X1 are established 122, 124. The image data is then filtered 126 using the first established window size X1 and a first threshold T1. Referring to the method of FIG. 2, once each of the pixels in the established window X1 for a selected pixel is processed and compared to threshold T1 (i.e., it is determined that the selected pixel is the last pixel to be processed in the window X1 with respect to threshold T1), the average for each of the pixel values of at least the luminance channel of all of the included pixels in the window X1 is calculated. The output for the selected pixel is then assigned the averaged value for at least the luminance channel. The process of assigning an average color to at least the luminance channel of the pixels in a window then continues (or is repeated) for each pixel selected in the image data. After each pixel in the image data is assigned an average value, the image data is then sigma filtered at least once more using a second established window X2 and a second threshold T2. A second threshold T2 and a second window X2 are established 130, 132. Each of the pixels in the second window X2 for a selected pixel are then processed and compared to second threshold T2 (i.e., it is determined that the selected pixel is the last pixel to be processed in the window X2 with respect to threshold T2), repeating the process described in FIG. 2. The average for each of the pixel values of at least the luminance channel of all of the included pixels in the window X2 is calculated, and the output for the selected pixel is then assigned the averaged value. The process of assigning an average color to at least the luminance channel of the pixels in a window then continues for each pixel selected in the image data until the last pixel is processed and the process ends 138.

Alternatively, in an embodiment, the above process of sigma filtering multiple times may also calculate the average for each of the pixel values of the luminance and chrominance channels of all of the included pixels, and may also assign an average color to the luminance and chrominance channels of the pixels in a window during the first, second, or all steps of decompressing and filtering the image data.

In an exemplary embodiment, the first window size X1 is generally smaller as compared to the second window size X2. Also, the first threshold T1 is generally larger as compared to the second threshold T2. For example, the image data may be first filtered using a smaller window size (e.g., 2×2) and a larger threshold (e.g., 1 halftone level), followed by further filtering using a larger window size (e.g., 4×4 or larger) with a smaller threshold (e.g., ⅓ of a halftone level). However, the size of the windows and thresholds should not be limited to those listed above in the exemplary embodiment. Also, in an alternate embodiment, a larger window size and smaller threshold may first be used to decompress the image data, followed by processing the image data using a smaller window size and larger threshold. Additionally, the multiple-step sigma filtering method may be performed any number of times.

After decompression using the sigma filtering process in FIG. 2 or 2a, the pixels of the image data may then be further processed (e.g., using rotation or scaling methods). The image may also be printed or displayed using an output device.

Figure 3:
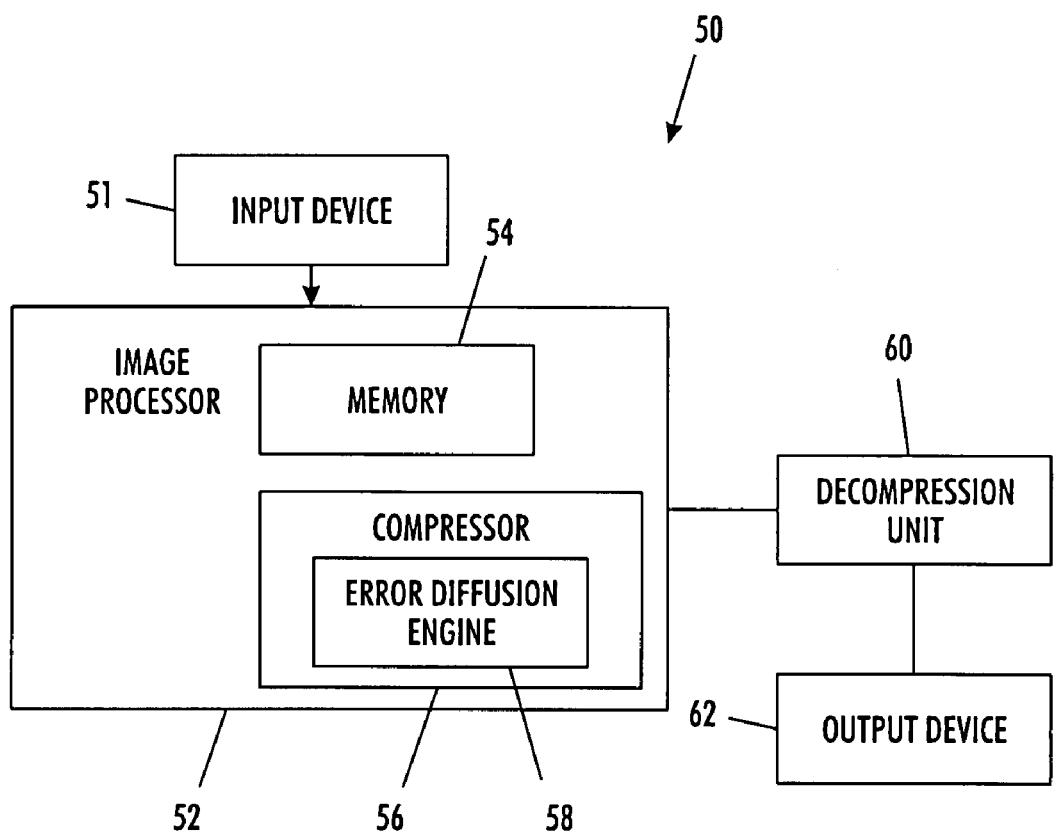
FIG. 3 is a block diagram for a system that may used to compress image data as described in the preferred embodiment.

FIG. 3 is a block diagram for a system 50 that may used to compress image data as described in the preferred embodiment. The system 50 comprises an image processor 52 and memory 54. Image processor 52 may receive image data from memory 54. Image data may also be scanned, for example, by an input device 51 such as a scanner, and input into image processor 52. The image processor 52 is used to modify the pixels of image data in a device space to a luminance and chrominance space. Particularly, as noted in FIG. 1, the pixels of the color image data are transformed to image data with a luminance channel and at least two chrominance channels by image processor 52. For example, image data that is inputted in RGB color space is transformed to YCbCr color space. The pixels have a plurality of color channels encoded by multiple bits.

Also included in the image processor 52 is compression unit 56 with an error diffusion engine 58. Error diffusion engine 58 in compression unit 56 is used to compress the image data in the luminance and chrominance space. That is, the error diffusion engine 58 compresses the color image data in YCbCr color space. When engine 58 compresses the YCbCr color space, the image data has a higher allocation of bits in the luminance channel than each of the chrominance channels. The compressed image data is stored in memory 54.

Also provided in system 50 is decompression unit 60. Decompression unit 60 is used to decompress the luminance and chrominance channels of the image data so that the image may be sent to output device 62. Decompression unit 60 obtains image data from memory 54. Decompression unit 60 preferably uses sigma filtering, as noted above with reference to FIGS. 1, 2, and 2a. Decompression unit 60 sends the decompressed image data to the output device 62. Output device 62 is used to reproduce the image data. Output device 62 is used to format the image data such that it is appropriate for the used output device. The image data thus undergo a transformation from luminance and chrominance space to a device space. The output device 62 determines which device space the pixels of image data are transformed to. For example, the output device may be an image output terminal (IOT), a display, or a printer. The image data may be formatted from YCbCr color space to RGB (e.g., for a display) or CMYK (e.g., for a printer) color space.

Although YCbCr color space is described as the luminance and chrominance space in the preferred embodiment, other color spaces with luminance and chrominance channels, such as YPbPr, YDbDr, YIQ, YUV, L*a*b, or YES may also be utilized.

While the principles of the application have been made clear in the illustrative embodiments set forth above, it will be apparent to those skilled in the art that various modifications may be made to the structure, arrangement, proportion, elements, materials, and components used in the practice of the described application.

It will thus be seen that the objects of this application have been fully and effectively accomplished. It will be realized, however, that the foregoing preferred specific embodiments have been shown and described for the purpose of illustrating the functional and structural principles of this application and are subject to change without departure from such principles. Therefore, this application includes all modifications encompassed within the spirit and scope of the following claims.

What is claimed is:

1. A processor-implemented method for decompressing an image data that is compressed using a halftone method in a luminance and chrominance space, the image data having a plurality of pixels wherein each pixel has a luminance channel and at least two chrominance channels, the luminance channel being encoded with a higher bit allocation than each of the chrominance channels; the method comprising the following acts implemented by a processor:

interpolating each of the chrominance channels for the pixels so that the chrominance channels have the same bit allocation as the luminance channel; and for each pixel:

establishing a window including the pixel and neighboring pixels;

comparing a bit value for the luminance channel for each neighboring pixel to a bit value for the luminance channel for the pixel; and for each neighboring pixel having a bit value for the luminance channel that differs from the bit value for the luminance channel for the pixel by less than a threshold of 1 halftone level, averaging the bit values of the luminance channel and each of the chrominance channels for those neighboring pixels and the pixel to output averaged bit values for each of the luminance and the chrominance channels for the pixel.

2. A method according to 1, further comprising decompressing the image data using the pixels with the averaged bit values for at least the luminance channel to create halftone image data.

3. A method according to 2, further comprising sending the image data to an output device for displaying or printing.

4. A method according to 1, wherein interpolating of the chrominance channels is established by pixel repetition.

5. A method according to 1, wherein the luminance and chrominance channels are any one of the following: YCbCr, YPbPr, YDbDr, YIQ, YUV, L*a*b, or YES.

* * * * *